Feb. 17, 1970     I. JACUBOWIEZ     3,495,654
DEVICE FOR SETTING IN MOTION POWDERY MATERIALS
FORMING A FLUIDIZED BED
Filed Jan. 12, 1967     2 Sheets-Sheet 1
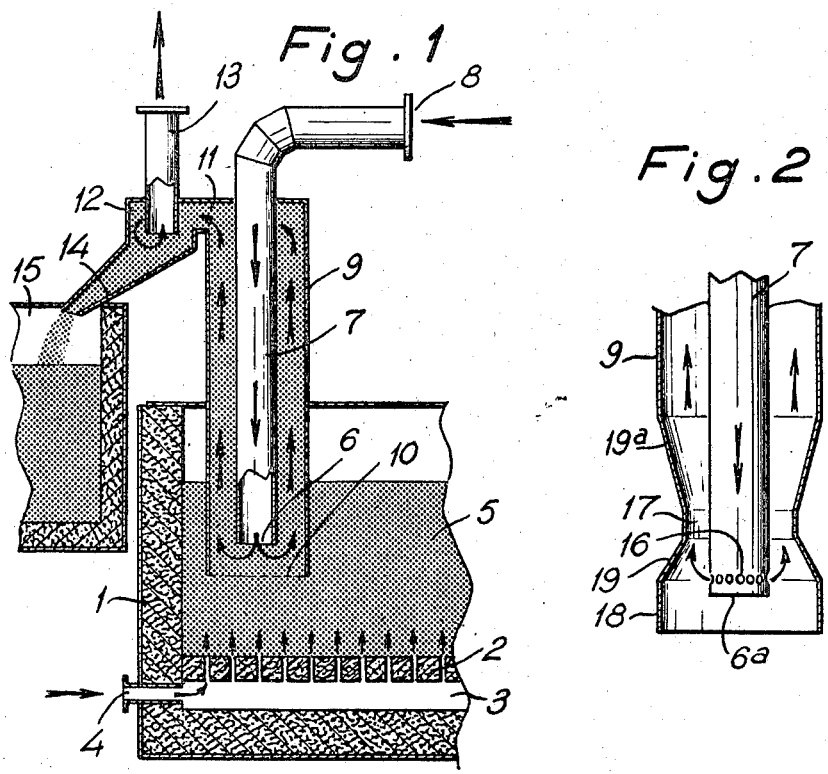
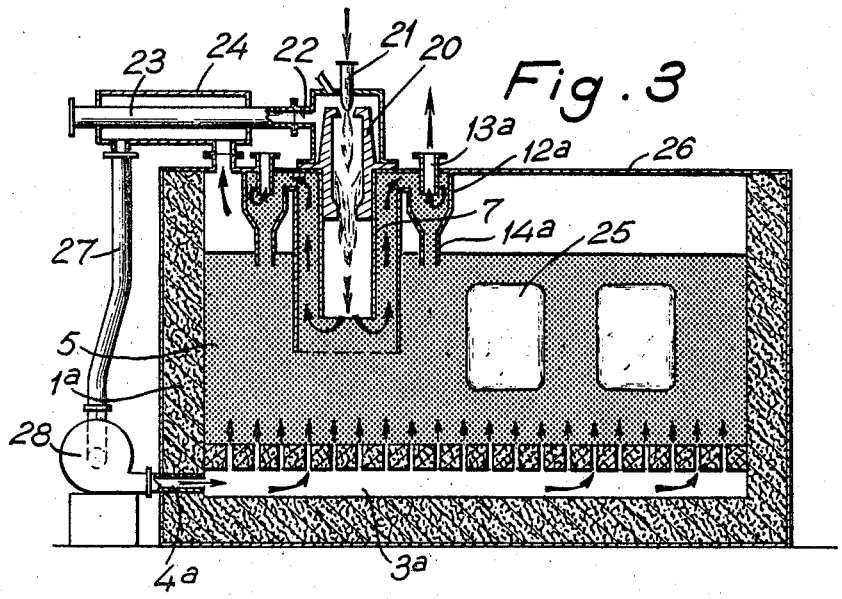

United States Patent Office 3,495,654
Patented Feb. 17, 1970

3,495,654
DEVICE FOR SETTING IN MOTION POWDERY MATERIALS FORMING A FLUIDIZED BED
Isidore Jacubowiez, Paris, France, assignor to Societe Anonyme Heurtey, Paris, France
Filed Jan. 12, 1967, Ser. No. 608,817
Claims priority, application France, Jan. 19, 1966, 46,386
Int. Cl. F28d 13/00
U.S. Cl. 165—104
11 Claims

ABSTRACT OF THE DISCLOSURE

A device is provided for setting the particles constituting a fluidized bed in motion externally of the bed and transferring heat thereto, by delivering an entrainment and heat transfer fluid into a top portion of the bed through the upper surface thereof in a direction opposite that of the sustaining fluid of the particles constituting said bed, said entrainment and heat transfer fluid streaming through the bed to transfer heat thereto and carry particles therewith, the fluid and particles being collected and separated externally of the bed.

---

A fluidized bed consists of solid particles in suspension in a fluid, as a result of which such a bed behaves substantially like a liquid. Such behavior, however, applies only to the space surmounting the perforated or porous wall through which the sustaining fluid is admitted. Thus the fluidized bed can reach neither subsidiary spaces nor other containers for as soon as the particles leave the space swept by an sustaining fluid, their state of suspension ceases.

It is the object of the present invention to enable an particles constituting the fluidized bed to retain their mobility in spaces located outside the bed proper. It is possible in this way to take advantage of the instrinsic qualities of fluidized beds, notably from the standpoint of thermic exchanges, whereby heat transfer can take place between the fluidized bed and external spaces, objects or fluids.

The invention accordingly relates to a device for setting the constituent particles of the fluidized bed in motion outside the bed proper and to effect heat transfer therewith. In the subject device of this invention, means submerged preferably in the upper part of the bed are provided for delivering a stream of entraining, heat transfer fluid, in conjunction with means for collecting this stream together with the entrained particles, the latter-mentioned means being arranged peripherally, preferably submerged at a greater depth, and adapted to convey the particles carried along by the stream to different utilization points.

The existence of a counter-pressure produced by the bed sustaining fluid avoids mixing between the sustaining fluid and the entraining, heat transfer fluid. As a result, these two fluids may be of different kinds with no greater danger than slight dilution of the former by the latter.

The entraining, heat transfer fluid may be a heating or a cooling fluid.

The particles may be entrained in such manner as to be conveyed to a space other than the bed itself. In an alternative form of embodiment, the particles are returned to the bed after being separated from the entraining, heat transfer fluid.

In yet another embodiment, the particles can be conveyed to a different bed after being separated as stated.

It is furthermore possible, through multiplication of the entrainments and mutual crossing thereof, to enable transfers to take place between the beds and to be utilized, particularly from the thermal standpoint.

The invention likewise relates to specific, preferred forms of embodiment of the devices hereinbefore disclosed.

In one form of embodiment, a device according to the invention includes an entrainment, heat transfer fluid-conveying tube which is immersed in a fluidized bed and which is surrounded by a riser-tube for discharging the entrained particles, and this riser-tube leads into a separator of the particles and the entrainment, heat transfer fluid that is in turn followed by an opening through which the separated particles fall.

The entrainment, heat transfer fluid conveying tube can be associated with a burner, in which case the entrainment, heat transfer fluid will consist of combustion gases.

Like the discharge tube, the entrainment, heat transfer fluid-conveying tube may be so shaped as to cause the assembly to form a blast-pump type extractor for improved extraction and conveying of the particles.

The separator can be a cyclone separator which has the entrainment fluid discharge tube leading into its center and which surmounts a chute for distributing the particles as required. The extractor blast-pump assembly can be provided in a fluidizing bed and the distribution chute can be arranged above a separate container. In an alternative arrangement, the chute can convey the particles either to the same fluidized bed or to a different bed.

Such arrangements readily permit the performing of conveying and transferring operations without pollution of the bed by the heat transfer fluid.

The description which follows with reference to the accompanying non-limitative exemplary drawings will give a clear understanding of how the invention can be carried into practice.

In the drawings:

FIGURE 1 is a fragmental schematic sectional view of an arrangement for conveying and heating the particles from a fluidized bed to a collecting container.

FIGURE 2 shows on an enlarged scale the extractor shaped end of the entrainment, heat transfer fluid-conveying tube and the shape of the entrained particles collecting tube.

FIGURE 3 shows an arrangement of this kind as applied to the heating of a fluidized bed directly by means of a burner.

Figure 4:
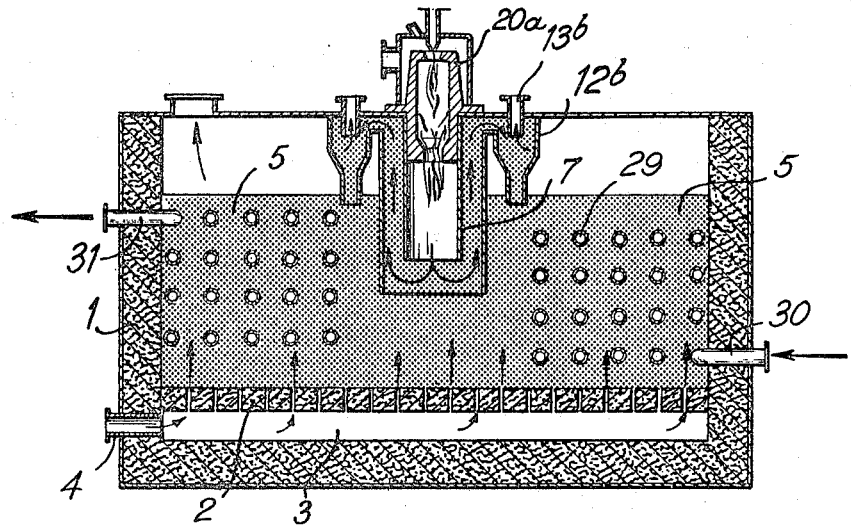
FIGURE 4 shows an alternative form of such an arrangement devised as a wall type heat exchanger.

The device shown in FIGURE 1 comprises a tank 1 across the bottom of which is a porous or perforated wall 2 below which is left a space forming a distribution chest 3 associated with a gas inlet stub 4, whereby to maintain a bed of particles 5 above chest 2 in the fluidized state. Into bed 5 is immersed the end 6 of a tube 7 for feeding an entrainment, heat transfer fluid fed through a stub 8. The descending tube 7 is surrounded by a jacket 9 the open end 10 of which dips more deeply into the bed 5 than the end 6 of tube 7. The jacket 9 is formed with a lateral port 11 communicating with a cyclone type separator 12. Dipping into the center of the separator is an entrainment, heat transfer fluid discharge tube 13, and the base of the separator communicates with a chute 14 the spout of which delivers the separated patricles under gravity into a receiving container 15.

As FIGURE 2 clearly shows, the lower end 6a of tube 7 is formed with radial openings 16 located below the neck 17 of an extractor formed at the base of jacket 9 comprising a bottom cylindrical section 18 surmounted by a convergent section 19 which begins at the same level as the opening 16 and which is in turn surmounted by the neck 17 and a divergent section 20, in that order.

With such an arrangement, heat transfer, the entraining gas flows from top to bottom through the tube 7, and the counterpressure produced by the fluid sustaining the bed 5 constrains this gas to rise through the jacket 9 without being able to penetrate the remainder of the bed. This rising motion of the entraining, heat transfer gas through the annular space causes a stream of particles to be carried along towards the port 11.

In order to obtain this entrainment effect, the geometrical dimensions, the pressures and flow rates are such the velocity of the entraining gas through the annular section is higher than the velocity of entrainment of the particles.

The absence of any bubbling in the bed itself at the foot of jacket 9 and externally thereof shows that the entraining gas does not penetrate into the bed. The profile shown in FIGURE 2 ensures improved distribution of the gas at the submerged ends of the tubes, thereby providing better extraction and evening-out of the velocities across the entire section.

The bed-forming particles can thus be heated and conveyed to another container such as the container 15, which can be located at a level well above that of the bed.

In the form of embodiment shown in FIGURE 3, the dipper tube 7 is supplied by means of a burner 20 in tube T and equipped with a gaseous or liquid fuel inlet 21 and with an intake 22 of air from the tubes 23 of a heat exchanger 24 through which flows the fluid for fluidizing the bed 5. The parts 25 to be heat-treated in a bath are placed in this fluidized bed. The tank 1a is provided with a cover 26 connected to the heat exchanger jacket 24 which is in turn connected through a conduit 27 to a blower 28 which raises the pressure of the fluid before delivering it through orifice 4a into the chest 3a. In this way, a recovery process is effected.

In view of the space available and the flow rates required, separation of the entraining fluid-forming gas from the entrained particles is accomplished by means of a plurality of cyclones 12a the discharge pipes 13a of which can be manifolded into a flue (not shown) and the chutes 14a of which dip into the fluidized bed 5 whereby to return the separated particles thereinto.

For a clearer understanding of the phenomena which accompany operation of such a device, it may be stated that with the burner 20 adjusted to supply 12,000 kcal./hr., or a gas mass flow of 15 kg./hr., it is possible to convey about one ton per hour of particles forming the fluidized bed.

The effectiveness of the heat transfer to the objects 25 to be treated and the efficiency of this heating arrangement can be explained by the intensified flow of particles through the extractor in contact with the combustion products issuing from burner 20. The particles carried along offer a very large specific area, thus permitting a high rate of heat exchange with the smoke combustion gases.

The burner can be lit in two different ways, by means either of a torch inserted through a tunnel therein or of a built-in electric igniter of either the resistance or spark-generating electrodes type.

This heating method permits direct contact between the bed particles and the combustion gases. Using different means, such direct heating would be possible only by internal combustion in the fluidized bed and at temperatures higher than 800° C., or else by providing a combustion chamber under pressure capable of supplying the diffuser formed by the wall supporting the fluidized bed. Such a diffuser capable of operating at high temperatures is difficult to design and tends to become carbonized at the least imperfection in combustion.

Manifestly, the apparatus hereinbefore described is much simpler and at the same time permits the use of any kind of fuel. Further, as previously indicated with reference to FIGURE 1, the combustion gases will not pollute the atmosphere of the fluidized bed.

It will therefore be appreciated that such direct heating in conjunction with an extractor makes is possible to use a cheap fuel instead of electrical heating, for instance, while at the same time dispensing with the use of smoke tubes, radiant tubes or other heat transfer walls, notably those made of refractory steel, which are invariably very costly to manufacture and maintain.

While the form of embodiment hereinbefore described refers to the heating of a fluidized bed, it will be manifest that such a bed could be cooled instead, as for instance in the case of hardening baths. In such cases it is necessary to dissipate a large quantity of energy in order to maintain the temperature of the bed constant regardless of the volume of the parts being treated.

In chemical engineering, furthermore, materials treated in a fluidized bed often require cooling prior to subsequent handling, packaging, or the like.

It will suffice in such cases to supply tube 7 with a cooled fluid, such as air for example, or to charge this entraining fluid with a liquid in spray form, such as water spray, to ensure energetic cooling of the fluidized bed without pollution of the sustaining gas in said bed.

This installation is suitable for other possible constructional forms, an example of which is shown in FIGURE 4.

In this alternative embodiment, the tank 1 is associated with a burner 20a but the fluidized bed 5 includes heat transfer tubes 29 that form a cluster provided with an inlet 30 on one side and an exhaust 31 on the other. Since the burner smokes do not come into contact with the heat exchanger tubes, it is possible to use fuels and oxidizers giving off highly corrosive gases, for example.

Should the burner 20a burn chlorinated hydrocarbons from which it is desired to extract hydrochloric acid, then the combustion products will consist of gases at high temperature which it is imperative to cool by diluting them as little as possible so as to help in recovering the acid after they issue from the tubes 13b of the cyclones 12b. On the other hand, the condensation of such gases on cold walls gives rise to unusually active corrosion phenomena.

With the apparatus shown in FIGURE 4, the sensible heat of the combustion products from burner 20a is used in the bed 5, which is cooled by the tubes 29 through which water or steam flows. The combustion products are thus actively cooled by the bed particles recycled through the annular space between tube 7 and jacket 9, without undue dilution by the fluidizing fluid, while the combustion heat is recovered by heat exchanger 29. The walls of this exchanger 29 are out of contact with the combustion products. When cold, such products lose their aggressive character and can be channelled toward a condenser.

In the arrangement described above, the heat transfer takes place through walls; alternatively, however, the heat exchange could be effected by direct contact between two fluids by using the fluidized-bed particles themselves as the intermediary, without a separating wall.

Figure 5:
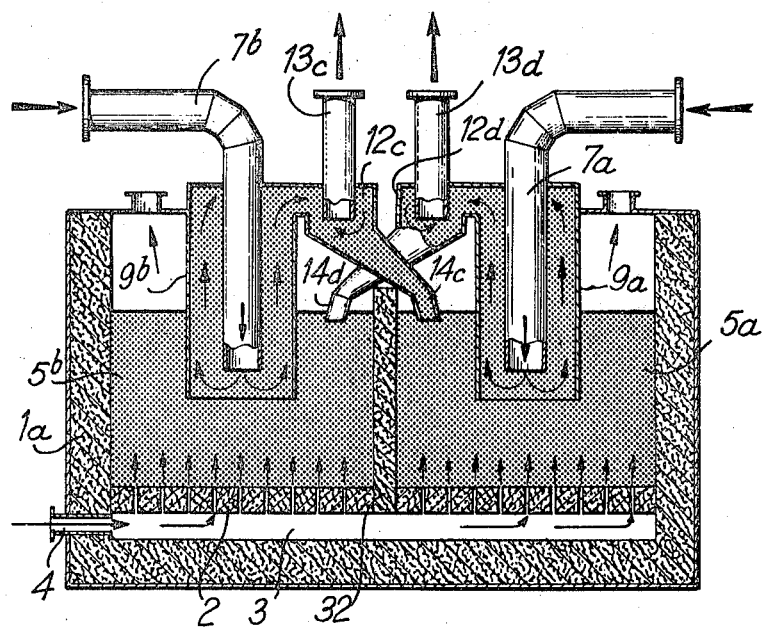
FIGURE 5 shows yet another alternative embodiment devised as a mixer type heat exchanger.

An arrangement for providing this form of heat transfer is shown in FIGURE 5 and comprises, in a tank 1a having diffusing wall 2 above chest 3 supplied through pipe 4, a wall 32 for separating two spaces 5a, 5b which contain identical equipment consisting, respectively, of entrainment, heat treatment fluid inlet tubes 7a, 7b and collector jackets 9a, 9b with cyclones 12c, 12d, the chutes 14c, 14d of which deliver the particles from one space into the adjacent space. Discharge tubes 13c, 13d are associated to these cyclones.

Two different gases can be led through the tubes 7a and 7b, respectively, and can issue from the discharge pipes 13c and 13d without being mixed together, this being achieved at the cost of slight dilutions by the fluidizing fluid, which fluid may be a gas that is neutral in respect of the other two gases.

The heat transfer takes place in active fashion by reason of the flow of particles between the two beds 5a and 5b.

Such physico-chemical separation and heat transfer call only for moderate pressurizations, in contrast to what would be required even if a simultaneous diffusion of the two gases were used for obtaining a fluidizer, for in that case it would be necessary to place the two gases under sufficient pressure to sustain the fluidization. But this in turn would inevitably mean a mixing of the two gases, which is precisely what the arrangement hereinbefore described avoids.

What is claimed is:

1. A device for setting the particles constituting a fluidized bed in motion externally of the bed and transferring heat thereto, said device having a fluidized bed, comprising means for delivering an entrainment and heat transfer fluid into the top portion of said bed through the upper surface thereof in a direction opposite to that of a sustaining fluid for the particles of the bed, means for collecting said entrainment and heat transfer fluid together with particles from the bed carried along therewith, means for conveying collected fluid and particles to utilization points, and means for separating said collected fluid and particles.

2. A device as claimed in claim 1 comprising means for counterstreaming said entrainment and heat transfer fluid against the direction of flow of the fluid sustaining said bed, and collecting means for said entrainment and heat transfer fluid directed in the same sense as the direction of flow of said sustaining fluid.

3. A device as claimed in claim 1 comprising means for producing said entrainment and heat transfer fluid to provide a heat input into the bed particles, the latter means comprising combustion means, said entraining and heat transfer fluid being the combustion products thereof.

4. A device as claimed in claim 1 comprising means for separating said particles and said entrainment, heat transfer fluid, and means for conveying separated particles to a place other than said fluidized bed.

5. A device as claimed in claim 1 comprising means for separating said particles and said entrainment, heat transfer fluid, and particle conveying means which return separated particles to said fluidized bed.

6. A device as claimed in claim 1, wherein said means for delivering entrainment and heat transfer fluid to said bed comprises a delivery tube for supplying entraining heat transfer fluid, said tube being immersed into said bed, a discharge tube surrounding the delivery tube and extending above the surface of the bed, said means for separating said collected fluid and particles comprising a separator connected to said discharge tube, and an entrainment fluid discharge conduit and a particle discharge chute extending from said separator.

7. A device as claimed in claim 6, wherein said discharge tube extends into the bed to a greater depth than the delivery tube, one of said tubes being shaped to form an extractor in the annular space between the tubes.

8. A device as claimed in claim 7 comprising a burner associated with said delivery tube, the combustion products of which burner at least partly constitute said entrainment and heat transfer fluid.

9. A device as claimed in claim 6, wherein said separating means comprises a cyclone-type separator having a solid-particle discharge orifice, and a container for receiving particles discharged from said orifice and having means for sustaining a fluidized bed.

10. A device as claimed in claim 6 comprising a wall-type heat exchanger in said fluidized bed.

11. A device as claimed in claim 9, wherein at least two fluidized beds are placed in mutual relationship through the discharge chutes of separators placed in one-to-one correspondence with fluidized beds proximate thereto, whereby to provide a mixture-type heat exchanger.

References Cited

UNITED STATES PATENTS

| | | | |
|---|---|---|---|
| 2,550,722 | 5/1951 | Rollman | 34—10 X |
| 2,729,428 | 1/1956 | Milmore | 165—104 |
| 2,751,756 | 6/1956 | Hughes et al. | 165—104 X |
| 2,928,184 | 3/1960 | Lonngren | 34—10 |
| 3,206,865 | 11/1960 | McEntee | 34—11 X |
| 3,273,873 | 9/1966 | Stanchel | 34—57 X |

ROBERT A. O'LEARY, Primary Examiner

ALBERT W. DAVIS, Assistant Examiner

U.S. Cl. X.R.

34—10, 11, 57, 102; 110—1; 122—4; 165—108